United States Patent
Payot et al.

(10) Patent No.: US 7,931,117 B2
(45) Date of Patent: Apr. 26, 2011

(54) GLAZING UNIT WITH IMPROVED VIBRO-ACOUSTIC DAMPING PROPERTIES, METHOD FOR MAKING SUCH GLAZING UNIT AND METHOD FOR ACOUSTIC PROTECTION IN A VEHICLE PASSENGER COMPARTMENT

(75) Inventors: Sylvain Payot, Compiegne (FR); David Fournier, Breteuil (FR); Marc Rehfeld, Ezanville (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/594,305

(22) PCT Filed: Apr. 1, 2008

(86) PCT No.: PCT/FR2008/050571
§ 371 (c)(1),
(2), (4) Date: Oct. 1, 2009

(87) PCT Pub. No.: WO2008/139082
PCT Pub. Date: Nov. 20, 2008

(65) Prior Publication Data
US 2010/0133037 A1   Jun. 3, 2010

(30) Foreign Application Priority Data

Apr. 6, 2007  (FR) ..................... 07 54361

(51) Int. Cl.
*F16F 7/00*   (2006.01)
(52) U.S. Cl. ...................... 181/207; 181/293
(58) Field of Classification Search .................. 181/207, 181/293; 428/68
See application file for complete search history.

(56) References Cited

U.S. PATENT DOCUMENTS

| | | | |
|---|---|---|---|
| 4,490,942 A | 1/1985 | Arnheim et al. | |
| 4,776,132 A | 10/1988 | Gold | |
| 5,290,973 A * | 3/1994 | Kwoh | 181/199 |
| 5,629,503 A * | 5/1997 | Thomasen | 181/199 |

(Continued)

FOREIGN PATENT DOCUMENTS

DE        36 17 602        11/1987

(Continued)

OTHER PUBLICATIONS

U.S. Appl. No. 12/680/,746, filed Mar. 30, 2010, Payot, et al.

*Primary Examiner* — Jeffrey Donels
*Assistant Examiner* — Forrest M Phillips
(74) *Attorney, Agent, or Firm* — Oblon, Spivak, McClelland, Maier & Neustadt, L.L.P.

(57) ABSTRACT

A glazing unit with improved vibro-acoustic damping properties, including at least one glass sheet and at least one vibro-acoustic damping strip fastened onto at least one of faces of the glass sheet and that includes at least one element made of damping material having a loss factor of at least 0.4 and a Young's modulus of less than 200 MPa at 20° C. for frequencies below 5000 Hz. The strip also includes at least one weighting element that has a linear mass of greater than 0.05 kg/m and is fastened onto the element made of damping material, the element made of damping material being inserted between the glass sheet and the weighting element, and no device other than the glazing unit being joined to the strip.

20 Claims, 5 Drawing Sheets

U.S. PATENT DOCUMENTS

| | | | |
|---|---|---|---|
| 6,478,110 B1 * | 11/2002 | Eatwell et al. | 181/207 |
| 7,721,844 B1 * | 5/2010 | Lewis et al. | 181/207 |
| 2002/0046901 A1 * | 4/2002 | Zapfe | 181/206 |
| 2006/0165977 A1 | 7/2006 | Rehfeld et al. | |
| 2008/0056505 A1 | 3/2008 | Rehfeld et al. | |
| 2009/0242322 A1 * | 10/2009 | Tsai | 181/207 |

FOREIGN PATENT DOCUMENTS

| | | |
|---|---|---|
| DE | 103 37 007 | 3/2005 |
| EP | 0 387 148 | 9/1990 |
| EP | 1 693 190 | 8/2006 |
| FR | 2 877 881 | 5/2006 |
| WO | 2004 012952 | 2/2004 |

\* cited by examiner

GLAZING UNIT WITH IMPROVED VIBRO-ACOUSTIC DAMPING PROPERTIES, METHOD FOR MAKING SUCH GLAZING UNIT AND METHOD FOR ACOUSTIC PROTECTION IN A VEHICLE PASSENGER COMPARTMENT

BACKGROUND OF THE INVENTION

I. Field of the Invention

The present invention relates to a glazing unit having improved vibro-acoustic damping properties, which comprises a vibro-acoustic damping device, and to a method of reducing acoustic and vibratory nuisance in a passenger compartment, in particular a moving passenger compartment such as that of a vehicle, especially an automobile.

Apart from automobiles or other types of vehicle, such as trucks, buses and agricultural machines, the invention applies to any type of locomotion means having a closed or substantially closed passenger compartment, such as airplanes, trains, ships, submarines, etc.

II. Description of Related Art

The glazing units associated with vehicles, especially automobiles, are provided with vibro-acoustic damping means that serve to absorb the vibratory waves propagating through the glazing unit for the purpose of improving acoustic comfort inside the vehicles.

The sources of annoyance in an automobile, whether their origin is mechanical, thermal, visibility-related, etc., have little by little been addressed. However, improvement in acoustic comfort still remains a current problem.

Noise of aerodynamic origin, i.e. created by the friction of the air against the moving vehicle, has itself been at least partly treated at its source: to save energy, shapes have been modified, improving penetration through the air and reducing the turbulence which is itself a source of noise. Among the walls of a vehicle that separate the source of exterior aerodynamic noise from the interior space occupied by passengers, the glazing units are of course the most difficult to deal with.

It is presently known to provide laminated glazing units, the thermoplastic interlayer of which is suitably chosen so as to have improved vibro-acoustic damping properties.

European patent EP B1-0 387 148 thus provides laminated glazing units that achieve good insulation against noise, particularly of aerodynamic origin, i.e. having a high frequency, between 800 and 10 000 Hz.

Furthermore, such laminated glazing units serve to prevent a sudden drop at the critical frequency in transmission loss, this being representative of acoustic insulation. The critical frequency is specific to the composition of the glazing unit (density and Young's modulus of the constituent elements, thicknesses) and corresponds to spatial and frequential coincidence of the flexural waves in the glazing unit with the acoustic waves in the fluid surrounding the glazing unit, such as the air. This critical frequency is typically in the region of 4000 Hz for a glazing unit approximately 3 mm in thickness.

It is at this critical frequency, which lies within the range of frequencies that are particularly audible to the human ear (between 1000 and 6000 Hz), that the noise can therefore be increased. It is desirable therefore to have good insulation performance for noise at this frequency.

An alternative solution (since some glazing units are not laminated) or a complementary solution to the use of laminated glazing units having improved vibro-acoustic properties may consist in joining, to the periphery of the glazing unit and between the glazing unit and the body, a strip having vibro-acoustic damping properties which is fastened both to the glazing unit and to the body and which may or may not consist of a juxtaposition of several damping materials.

The term "damping material" is understood in the rest of the description to mean a viscoelastic material having a loss factor of greater than 0.25, which is thus a material capable of dissipating energy. It may for example belong to the family of polymers.

Patent application WO 04/012952 discloses a strip which, in order to provide such a vibro-acoustic damping property, must have an equivalent real linear stiffness $K'_{eq}$ of at least 25 MPa together with an equivalent loss factor $\tan \delta_{eq}$ of at least 0.25. The equivalent linear stiffness is the equivalent stiffness of the strip per linear meter of strip, the stiffness being characterized by the rigidity (mainly the Young's modulus for work in tension-compression) of the materials of which the strip is made and by the geometry of the strip.

In this type of strip, only the stresses and strains undergone by the materials working in tension-compression in the direction normal to the glazing unit are taken into account, those working in shear being negligible. Indeed, compared to the strip, the body is so rigid that it does not deform and cannot absorb vibratory energy. Only the strip can deform significantly and dissipate mechanical energy by working mainly in tension-compression.

This type of damping strip, by also constituting the peripheral joint by which the glazing unit is bonded, is therefore suitable as it provides the connection between the glazing unit and the body. However, in a vehicle not all the glazing units are fixed over their entire periphery to the body—some of them, such as opening side glazing units, are movable. Thus, this peripheral bonding seal configuration acting as damping means cannot be suitable for these side glazing units.

BRIEF SUMMARY OF THE INVENTION

The object of the invention is therefore to provide the glazing unit with a vibro-acoustic, more particularly high-frequency, damping means which is an alternative to or complements the existing means, such as laminated glazing units and peripheral joints for bonding a glazing unit.

According to the invention, the glazing unit, which is intended to be housed in a body, comprises at least one glass sheet and at least one vibro-acoustic damping strip, which is fastened onto at least one of the faces of the glass sheet and which comprises at least one element made of damping material having a loss factor of at least 0.4, and is characterized in that the strip is joined to no other device on the opposite side of the glass sheet, in particular is independent of the body, and in that the strip also includes at least one weighting element that has a linear mass of greater than 0.05 kg/m and is fastened onto the element made of damping material, the linear mass corresponding to the ratio of the mass of the weighting element to the length of said weighting element along its greatest extent in contact with the damping element, the element made of damping material being inserted between the glass sheet and the weighting element and having a Young's modulus of less than 200 MPa at 20° C. for frequencies below 5000 Hz, the weighting element being joined only to the face of the element made of damping material which is on the opposite side from that in contact with the face of the glass sheet.

The strip is joined to one face of the glazing unit, i.e. to a surface of the glazing unit that extends over its largest extents, and is not joined to an edge of the glazing unit.

It should be noted that the linear mass corresponds to the ration of the mass of the weighting element to the length of said weighting element in contact with the damping element. The linear mass may also be equivalently defined by the product of the material constituting the weighting element and the area of its cross section when said section is identical over the entire length of the element or, if the element consists of several materials, the sum of the products of the density of each material and the cross section of each material.

When the weighting element has a cross section that varies over its length, the linear mass is preferably calculated from the mass of the element divided by its total length in contact with the damping element.

Thus, the glazing unit provides vibro-acoustic damping properties whatever the way in which it is joined to the body of the vehicle and independently of the body, the damping material being able to fully play its role as vibratory energy dissipater as it is placed between two bulk elements, which are the glass of the glazing unit and the weighting element of the strip.

It is imperative for the strip to be joined only to the glazing unit and to be independent of any other mass on the opposite side of the glazing unit. No device is joined to the part of the strip on the opposite side from that joined to the glass sheet of the glazing unit. In particular, since the glazing unit may at least partly be joined to the body, in particular for retaining it in a housing associated with the body, the strip fastened to the glazing unit remains, however, completely independent of the body, i.e. it does not even touch the body.

In addition, the weighting element must be in contact only with one face of the element made of damping material, namely the face on the opposite side from that in contact with the glazing unit.

Although the area of the weighting element is not equivalent to the area of the glass sheet of the glazing unit, the combination formed by the strip and the glass sheet constitutes, unexpectedly, a system substantially equivalent to a mass-spring-mass system.

In a mass-spring-mass system, the stiffness of the spring may be adjusted so as to maximize the work of the spring for a certain target frequency (resonant frequency of the mass-spring-mass system) so as to dissipate the maximum amount of energy at this frequency.

The system of the invention cannot strictly comply with the known relationship relative to the stiffness of a spring in a mass-spring-mass system, but the inventors have known how to adapt a relationship to the system of the invention, the spring of which can be likened to the damping element, so as to characterize the stiffness of the damping element.

Therefore, the cross section s of the strip, only one side of this section being in contact with the glazing unit and corresponding to one of the shortest extents, can be advantageously adapted while still taking into account the Young's modulus that the damping material has so that the dissipation of vibratory energy by the damping element is maximized at a particular frequency for which it is desired to obtain particularly improved noise insulation.

Advantageously, to dissipate the maximum amount of energy, the cross section s of the element made of damping material, defined by a width L in contact with the glazing unit along one of the shortest extents and by a thickness e normal to the glazing, must have dimensions such that the equivalent linear stiffness $K'_{eq}$ of the damping element satisfies, at a targeted particular frequency $f_p$, the criterion:

$$\frac{K'_{eq}}{\rho_v e_v \lambda_p \omega_p^2} < \frac{1}{2} \text{ where: } K'_{eq} = \frac{E' L}{e}$$

in which:
$E'$ is the Young's modulus at 20° C. of the damping material at the frequency $f_p$;
L is the width of the damping element in contact with the glazing unit;
e is the dimension of the damping element normal to the glazing,
and in which:
$\rho_v$ is the density of the material of which the glazing unit is made;
$e_v$ is the thickness of the glazing unit;
$\omega_p$ is the target angular frequency at the particular frequency $f_p$ defined by $\omega_p = 2\pi/f_p$; and
$\lambda_p$ is the wavelength in the glazing unit corresponding to the particular frequency $f_p$ and defined in a known manner by:

$$\lambda_p = 2\pi \sqrt[4]{\frac{E'_v e_v^2}{12(1-v_v^2)\rho_v \omega_p^2}}$$

and in which $E'_v$ and $v_v$ are the Young's modulus and the Poisson's ratio of the material of which the glazing unit is made, respectively.

Preferably, the particular frequency $f_p$ corresponds to the critical frequency of the glazing unit, to within ±30% of this critical frequency.

According to one feature, the weighting element is in contact with only a single face of the element made of damping material and along the greatest extent of the damping element.

According to another feature, the strip is arranged in a marginal portion of the glazing unit, especially close to the edge or at the edge of the glazing unit, and extends over at most the length of one side of the glazing unit.

Several alternative embodiments of the strip may be envisioned:
the strip comprises a single element made of damping material and a single weighting element;
the strip comprises a plurality of elements made of damping material, which may or may not be juxtaposed and which extend side by side along their largest extents, and a single weighting element which covers one of the faces of each element made of damping material; and
the strip comprises a plurality of weighting elements that are fastened onto a single element made of damping material and which extend along the largest extent of the damping element, which weighting elements may or may not abut one another.

The weighting element, which must have a certain linear mass, is chosen according to the material or materials of which it is made. Its geometry may be adapted according in particular to the nature of the material and to the available space that will be provided for fitting the glazing unit in its final position. It consists at least of a web which is fastened onto one of the faces of the elements made of damping material and may advantageously include a reinforcement joined to the web.

The weighting element may consist of one or more materials, the combination of materials having to ensure that the element has a linear mass of at least 0.05 kg/m.

According to another feature, the element made of damping material is constituted of one or more damping materials which each have a loss factor of at least 0.4 so as to ensure sufficient energy dissipation.

Of course, the glazing unit may have several strips of the invention.

According to an exemplary embodiment, the damping material is an elastomer and the weighting element is a metal plate.

Advantageously, the glazing unit of the invention is housed in the body of a vehicle, especially an automobile, the strip being hidden from view.

Another subject of the invention is a method of manufacturing a glazing unit for the purpose of reducing acoustic and vibratory nuisance in a passenger compartment of a vehicle, especially an automobile, comprising such a glazing unit, the method, consisting in joining at least one vibro-acoustic damping strip to the glazing unit, is characterized in that:

a strip comprising at least one element made of damping material having a loss factor of at least 0.4 and a Young's modulus at 20° C. of less than 200 MPa, for frequencies below 5000 Hz, and at least one weighting element having a linear mass of at least 0.05 kg/m fastened onto only one face of the damping element along its greatest extent are provided;

the cross section s of the element made of damping material (20) is adapted, said section being defined by a length L in contact with the glazing unit along its shortest extent and by a thickness e normal to the glazing unit, according to the Young's modulus of the damping material, such that the equivalent linear stiffness $K'_{eq}$ of the damping element satisfies, at a targeted particular frequency $f_p$, the criterion:

$$\frac{K'_{eq}}{\rho_v e_v \lambda_p \omega_p^2} < \frac{1}{2}$$

where:

$$K'_{eq} = \frac{E'L}{e}$$

in which:
E' is the Young's modulus at 20° C. of the damping material at the frequency $f_p$;
L is the width of the damping element in contact with the glazing unit;
e is the dimension of the damping element normal to the glazing,
and in which:
$\rho_v$ is the density of the material of which the glazing unit is made;
$e_v$ is the thickness of the glazing unit;
$\omega_p$ is the target angular frequency at the particular frequency $f_p$ defined by $\omega_p = 2\pi f_p$; and
$\lambda_p$ is the wavelength in the glazing unit corresponding to the particular frequency $f_p$ and defined in a known manner by:

$$\lambda_p = 2\pi \sqrt[4]{\frac{E'_v e_v^2}{12(1-v_v^2)\rho_v \omega_c^2}}$$

and in which $E'_v$ and $v_v$ are the Young's modulus and the Poisson's ratio of the material of which the glazing unit is made, respectively; and the strip is fastened onto the glazing unit via the face of the element made of damping material on the opposite side of the face fixed to the weighting element, no other device being joined to the strip.

Finally, the invention relates to an acoustic protection method in a passenger compartment of a vehicle, especially an automobile, comprising a glazing unit of improved vibro-acoustic damping which comprises at least one vibro-acoustic damping strip, characterized in that said method consists in using a strip comprising at least one element made of damping material having a loss factor of at least 0.4 and a Young's modulus of less than 200 MPa at 20° C. for frequencies below 5000 Hz, and at least one weighting element fastened onto a single face of the damping element along its greatest extent, the strip being fastened via the element made of damping material onto one of the faces of the glazing unit on the opposite side from the weighting element, no device other than the glazing unit being joined to the strip, in particular via the weighting element.

For the manufacturing method and the acoustic protection method, it will be advantageous to use a glazing unit according to the invention as described above, in particular the cross section of the damping material would be adapted according to the Young's modulus that the damping material has in such a way that the frequency for maximum dissipation by the damping element is targeted on a particular frequency, especially the critical frequency of the glazing unit.

The loss factor and Young's modulus characteristics are preferably measured using a viscoanalyzer.

BRIEF DESCRIPTION OF THE DRAWINGS

Other details and advantages of the invention will now be described with regard to the appended drawings in which:

FIGS. 1 to 10 have not been drawn to scale so as to make them easier to understand.

DETAILED DESCRIPTION OF THE INVENTION

Figure 1:
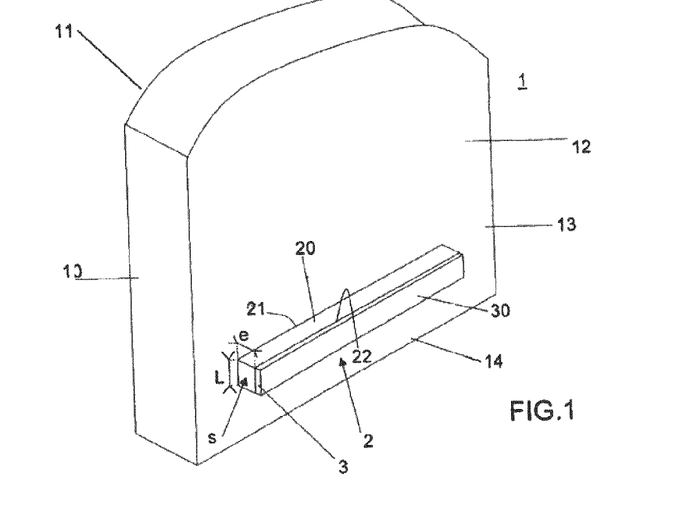
FIG. 1 is a perspective view of a glazing unit provided with a vibro-acoustic damping strip according to the invention.

FIG. 1 illustrates a glazing unit 1 provided with vibro-acoustic damping means of the invention formed by at least one strip 2.

The glazing unit 1 is intended to be housed in a vehicle body 4, such as that of an automobile, for example in a door well in order to form a side glazing unit (FIG. 2), sealing being provided by a usual seal 40. This glazing unit here is monolithic, and therefore comprises one glass sheet 10, but it could for example be laminated and include a plastic interlayer sandwiched between two glass sheets.

The glazing unit 1 has two opposed faces 11 and 12, one being intended to face the interior of the vehicle while the other is turned toward the external environment.

In addition, the glazing unit 1 has a marginal portion 13 which is located on one side 14 and bounded by the dotted line in FIG. 1. This portion is called the bottom band in the case of an opening side glazing unit. This marginal portion is intended not to be visible, as it has to be housed in the body in order to fix the glazing unit.

Figure 2:
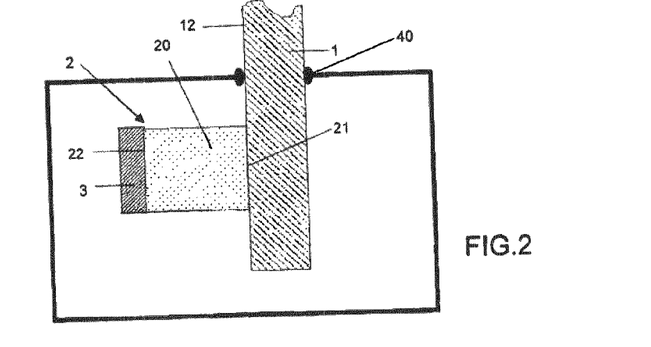
FIG. 2 is a partial schematic cross-sectional view of FIG. 1, the glazing unit being incorporated into a vehicle body.

The strip 2 is housed in this marginal portion 13 but necessarily remains independent of the body. It is simply attached to one face of the glass sheet of the glazing unit and is not in contact with any other device on the opposite side of the glazing unit, as illustrated in FIG. 2.

The strip therefore constitutes a device attached to the glazing unit and independent of any other system with which the glazing unit may be associated.

The strip 2 comprises a first element 20 made of damping material and a second element 3, called a weighting element, which has a linear mass of at least 0.05 kg/m.

The element 20 made of damping material is fastened, on the one hand, to the glazing unit via one of its faces and, on the other hand, to the weighting element 3 via its opposite face. The weighting element 3 is joined to the element made of damping material only via one of its faces and along its longest extent, this face being the one on the opposite side to the face for fastening the element made of damping material to the glazing unit. The weighting element 3 has no other join than the effective join to the element 20 made of damping material.

The element 20 made of damping material has a loss factor of at least 0.4 and a Young's modulus of less than 200 MPa at 20° C. for frequencies below 5000 Hz.

Furthermore, the damping element 20 has a cross section s made up of at least one dimension L in contact with the glazing unit along the shortest extent and a dimension e normal to the glazing unit, these dimensions being adapted according to the Young's modulus of the material in such a way that the frequency for maximum dissipation by said element lies within a predefined frequency range in relation to the noise insulation that it is desired to obtain for said frequency range.

The length has no influence on the maximum dissipation frequency, however; the longer the profile the greater the dissipation will be. The strip will be designed so as to have a length that corresponds to the greatest extent i.e. greater than the dimension L and preferably greater than at least twice this quantity L.

For a parallelepipedal damping element, the cross section s is made up of a width L corresponding to the side in contact with the glazing unit and a thickness e corresponding to the side perpendicular to the width (FIG. 1).

In order to adapt these dimensions, the notion of equivalent linear stiffness $K'_{eq}$ that the damping element must have at the frequency for which it is desired to dissipate the maximum amount of energy is used.

If this particular targeted frequency, for which it is desired to provide maximum damping, is denoted by $f_p$, then the equivalent linear stiffness $K'_{eq}$ of the damping element will be defined in the case of a single material by:

$$K'_{eq} = \frac{E'L}{e}$$

in which:
E' is the Young's modulus at 20° C. of the damping material at the frequency $f_p$;

L is the width of the damping element in contact with the glazing unit; and e is the dimension of the damping element normal to the glazing unit.

The inventors have demonstrated that the equivalent linear stiffness $K'_{eq}$ of the damping element must, in order for the system to be effective at the target frequency, necessarily satisfy the following condition:

$$\frac{K'_{eq}}{\rho_v e_v \lambda_p \omega_p^2} < \frac{1}{2} \quad (1)$$

in which:
$\rho_v$ is the density of the material of which the glazing unit is made;
$e_v$ is the thickness of the glazing unit;
$\omega_p$ is the target angular frequency at the particular frequency $f_p$ defined by $\omega_p = 2\pi f_p$; and
$\lambda_p$ is the wavelength in the glazing unit corresponding to the particular frequency $f_p$ and defined in a known manner by:

$$\lambda_p = 2\pi \sqrt[4]{\frac{E'_v e_v^2}{12(1-v_v^2)\rho_v \omega_p^2}}$$

and in which $E'_v$ and $v_v$ are the Young's modulus and the Poisson's ratio of the material of which the glazing unit is made, respectively.

It has been found that for vehicles, in particular for automobiles, the frequency range for which it is desired to obtain improved insulation corresponds to the frequency range lying around the critical frequency of the glazing unit. It will therefore be advantageous to choose a particular frequency equal to, or within ±30% of, the critical frequency of the glazing unit ($f_p = f_c$ or $f_c \pm 30\%$). It is in fact around this critical frequency that the transmission of noise from outside the vehicle, through the glazing unit, is the most marked, being manifested in terms of measurement by a pronounced drop in acoustic insulation. The invention is therefore more particularly aimed at this frequency range so as to improve the vibro-acoustic damping of a glazing unit. Thus, the particular frequency $f_p$ may more particularly correspond to the critical frequency of the glazing unit.

The critical frequency $f_c$ of the glazing unit depends only on the properties of the constituent material and on the thickness of the glazing unit. Its value is calculated in a known manner in the following formula:

$$f_c = \frac{c_0^2}{2\pi}\sqrt{\frac{12\rho_v(1-v_v^2)}{E'_v e_v^2}}$$

where $c_0$ is the velocity of sound in the fluid, generally the air.

The damping element 20 has a face 21 joined to one of the faces 12 of the glazing unit and an opposite face 22 joined to the weighting element 3. On the opposite side of the damping element, the weighting element is not in contact with any other device.

Each of the faces is joined by adhesive means compatible with each of the materials. The adhesive means are of known type, for example self-adhesive means, or they consist of a thermally activated adhesive.

The joining may also be carried out by suitable techniques when the damping element and the weighting element are made of materials permitting such techniques. For example, the materials are welded together by supplying heat.

The damping element 20 may consist of a single damping material or a juxtaposition of a plurality of damping materials.

Each of the materials must have a loss factor of at least 0.4 and the geometry given to each material will be adapted so as to satisfy relationship (1). The relationship (1) will then be checked by measuring the equivalent linear stiffness of the damping element using a viscoanalyzer.

The weighting element 3 must necessarily be in contact with at least one face of the damping element along its greatest extent, which corresponds to the face 22 on the opposite side from that 21 resting against the glazing unit, so that the damping element sandwiched between two bulk elements—the glass of the glazing unit and the element 3—works entirely in tension-compression in the manner of a spring so as to dissipate the maximum amount of energy.

For this purpose, the weighting element 3 has a linear mass of at least 0.05 kg/m.

The bulk nature of the weighting element is not only obtained by the nature of the material but also by varying the geometry of the element (thickness of the web fastened to the damping material and/or addition of reinforcements).

Of course, the weighting element may be formed from a plurality of materials acting as mass and assembled, for example as laminates, or combined so as to form a particular geometric structure.

The element 3 illustrated in FIG. 1 is formed from a single web 30 having a thickness of at least 1 mm, such as for example a 2 mm thick steel plate.

FIGS. 3 to 6 show embodiments of the rigid element with, for each of them, a web 30 fastened to the damping element 20.

Figure 3:
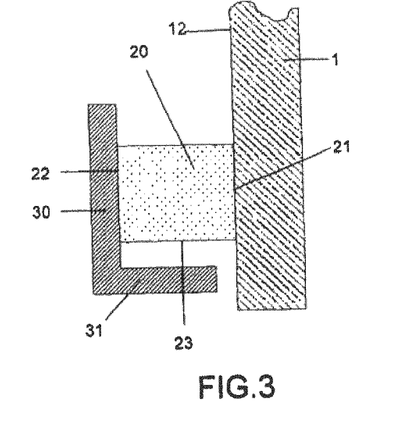
FIGS. 3 to 7 are partial schematic cross-sectional views of several embodiments of a vibro-acoustic damping profile according to the invention, joined to a glazing unit.

FIG. 3 shows an L-shaped element with an end flange 31 perpendicular to the web 30.

Figure 4:
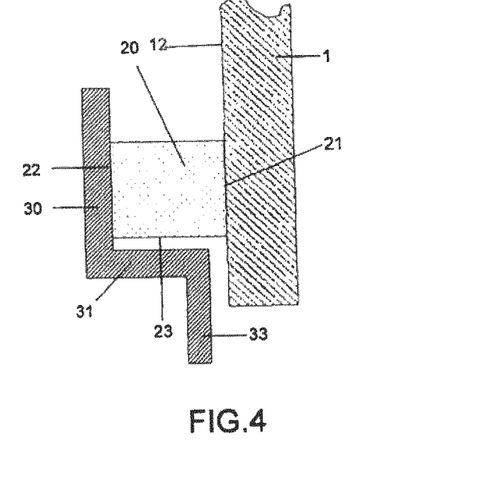

FIG. 4 shows an L-shaped element with an end flange 31 which is perpendicular to the web 30, and a return 32 which is parallel to the web 30 and of opposite direction. The return 32 remains facing the same face 12 of the glazing unit bearing the damping element 20.

Figure 5:
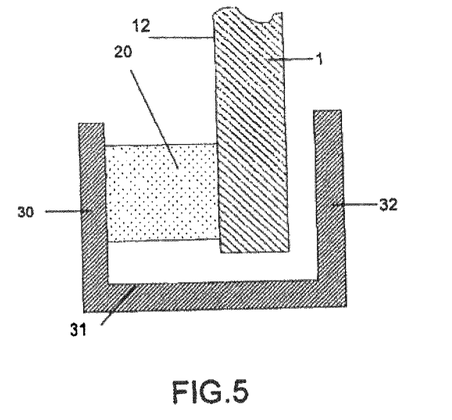

FIG. 5 shows a U-shaped element with an end flange 31 which is perpendicular to the web 30, and a return 33 which is parallel to and faces the web 30. The flange 31 is long enough so that the return 33 lies facing the face 11 of the glazing unit opposite that bearing the damping element 20.

Figure 6:
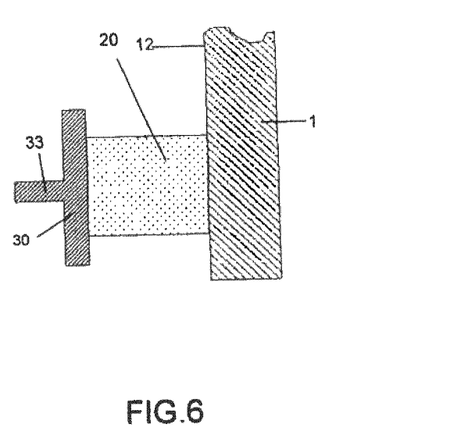

FIG. 6 shows a T-shaped element with a central portion 34 which is perpendicular to the web 30 and opposite the face for joining to the damping element.

For the embodiments shown in FIGS. 3, 4 and 5, the web 30 of the weighting element has a portion extending along one of the short extents of the damping element, here in the form of the flange 31. To provide the optimum vibratory damping function, this flange is not in contact with the damping element, as illustrated in the figures.

Figure 7:
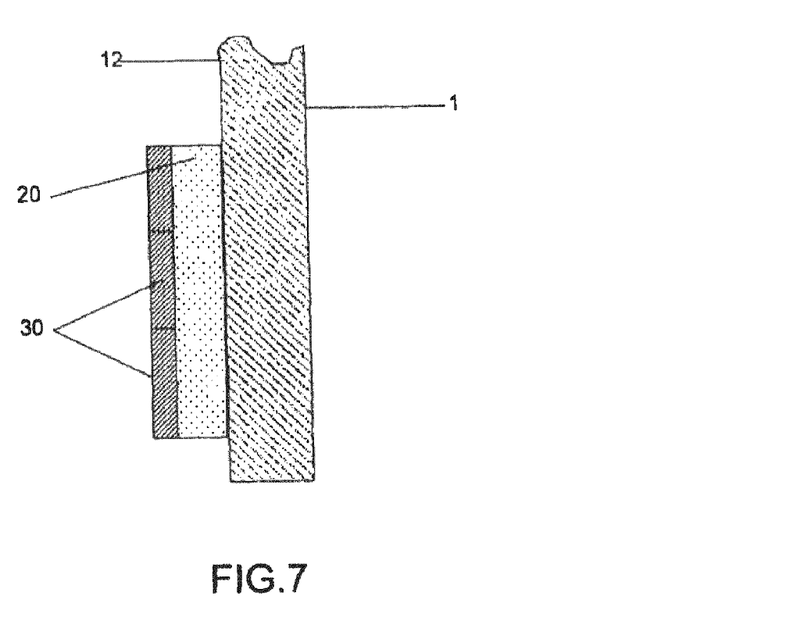

The weighting element 3 of the strip is a unitary element, as illustrated in FIG. 1, extending along the length of the damping element 2. However, depending on the nature of material of the weighting element and in particular the shape in which it is commercially available, for example with certain dimensions, it is possible to envision a plurality of weighting elements 3 that extend along the length of the damping element 2, all being abutted together (FIG. 7).

Figure 8:
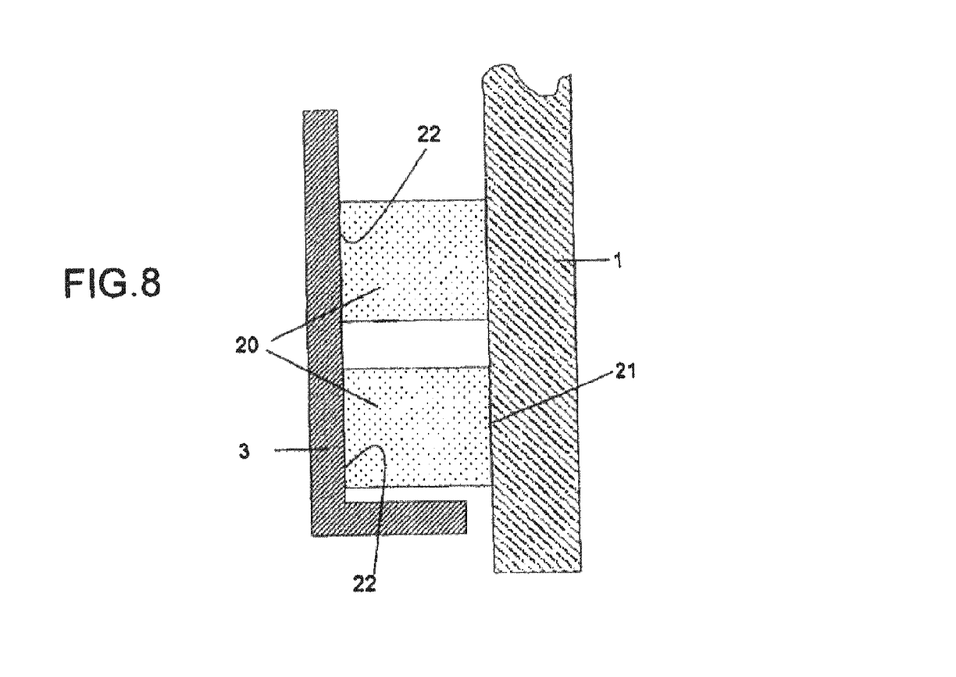
FIGS. 8 to 10 are cross-sectional views of other embodiments on which strips according to the invention are joined to a glazing unit.
Figure 9:
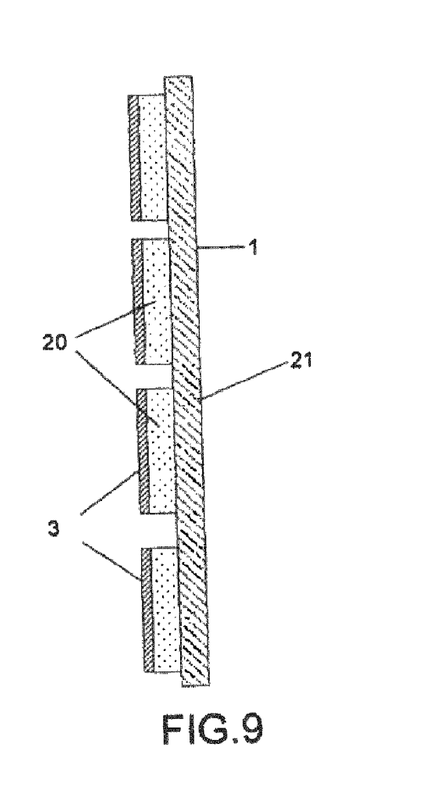
Figure 10:
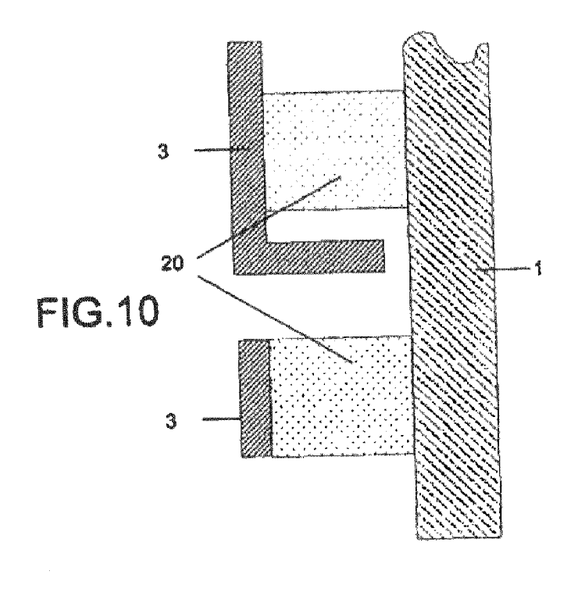

Finally, FIGS. 8, 9 and 10 show additional embodiments of the damping means.

FIG. 8 illustrates a strip 2 having two elements 20 made of damping material which are placed one beside the other while being spaced apart, and a single L-shaped weighting element 3 that covers the joining faces 22 of the two elements and the spacing gap.

The glazing unit may also have several damping strips 2, whether or not of the same configuration, as may be seen in FIGS. 9 and 10 respectively.

FIG. 9 shows a combination of several strips 2 corresponding to that of FIG. 1.

FIG. 10 illustrates a combination of two strips 2 corresponding to the strip of FIG. 1 and that of FIG. 3 respectively.

The embodiments described above have one or more strips placed only on one side of the glazing unit, but it is also conceivable to provide, in addition, one or more strips on the opposite face of the glazing unit, when this embodiment is compatible with the available space of the installation intended for receiving the glazing unit.

To demonstrate the effectiveness of the damping means of the invention, the attenuation in vibratory level of a glazing unit provided with damping means in comparison with a bare glazing unit was demonstrated over the 2500-10 000 Hz frequency range, which included the critical frequency of the glazing unit.

The vibration levels of a bare glazing unit excited by airborne means are higher than those of the glazing unit provided with the damping means of the invention, since the vibratory energy of the glazing unit is dissipated through the element 20 made of damping material. Therefore the pressure levels in the passenger compartment are lower, and consequently the noise is attenuated.

Figure 11:
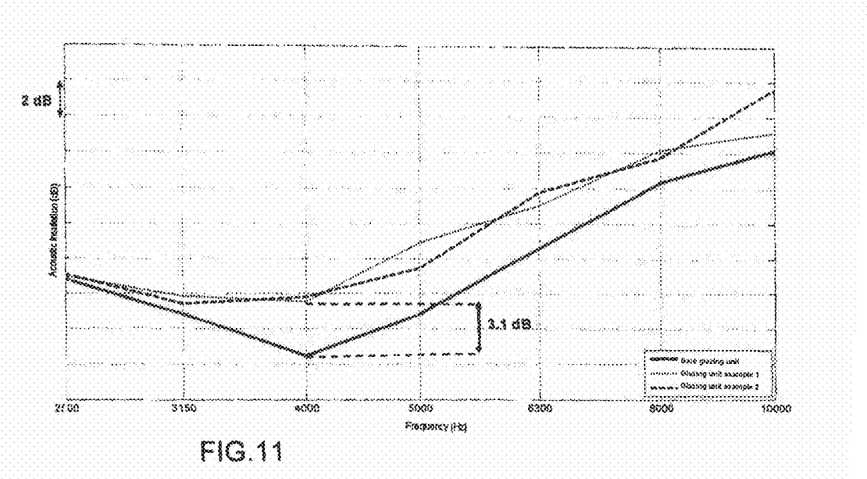
FIG. 11 shows high-frequency acoustic insulation curves for comparing a bare glazing unit with two examples of glazing units provided with a strip according to the invention.
Figure 12:
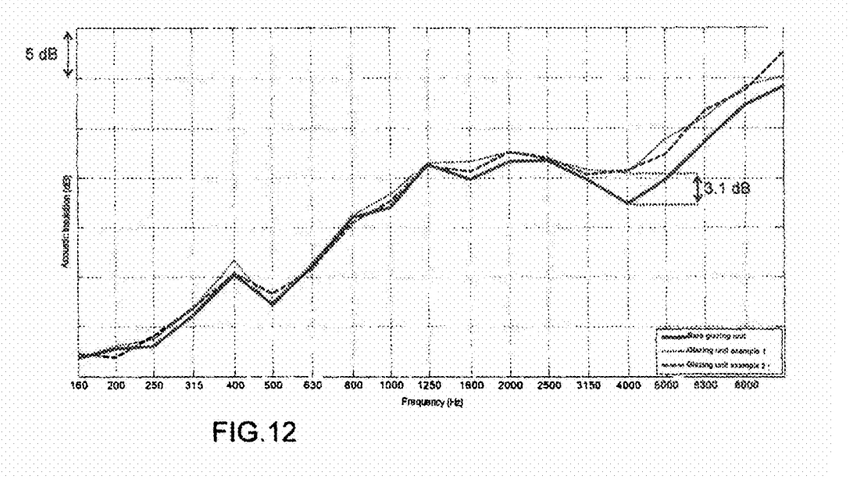
FIG. 12 shows curves for the glazing units of FIG. 11 extending from low frequencies to high frequencies.

FIG. 11 thus shows comparative curves for the acoustic insulation inside, on the one hand, a vehicle having one of its glazing units provided with the damping means of the invention and, on the other hand, a similar vehicle in which the equivalent glazing unit does not have the means of the invention.

The method for reducing acoustic and vibratory nuisance in a passenger compartment of a vehicle, particularly an automobile, therefore consists in providing a glazing unit furnished with a strip according to the invention.

The vehicle used for the demonstration was a passenger car of the Mégane II type from the automobile manufacturer Renault.

The glazing unit used for the test corresponded to a glass front door side opening pane having a thickness of 3.85 mm. Its critical frequency $f_c$ was thus about 3100 Hz.

Two examples of glazing units having the damping means of the invention working in tension-compression were chosen in order to compare them with a glazing unit that was not provided therewith.

Each example of a strip as damping means had a length of 0.5 m and included, as weighting element, a steel plate 2 mm in thickness having a linear mass of 0.32 kg/m and, as damping element, an elastomer such as the butyl rubber Terostat 969 sold by Henkel for Example 1 and ViscoDamp T sold by ENAC for Example 2. The damping element was fastened to the steel plate and to the glazing unit by applying heat. The table below summarizes the characteristics relating to the damping material of each strip example.

|  | Example 1 based on Terostat 969 butyl rubber | Example 2 based on ViscoDamp T |
| --- | --- | --- |
| 20° C. Young's modulus E' at 4000 Hz | 50 MPa | 50 MPa |
| loss factor tanδ at 20° C. and 4000 Hz | 1.1 | 1.6 |
| Cross section (L × e) | 5 mm × 6 mm | 6 mm × 5.2 mm |
| $\dfrac{K'_{eq}}{\rho_v e_v \lambda_p \omega_p^2}$ | 0.1 | 0.14 |

The cross section L×e of the damping element was chosen so that the relationship (1) given above was satisfied for a particular frequency $f_p$ corresponding to the critical frequency of the glazing unit.

The expression $$\frac{K'_{eq}}{\rho_v e_v \lambda_p \omega_p^2}$$

thus obtained was approximately equal to 0.1 and therefore met the abovementioned criterion, i.e. less than 0.5.

The vehicle was placed, in a known manner, in a reverberant room designed for acoustic insulation measurements. The glazing unit was subjected to a diffuse field, while the other glazing units of the vehicle were masked by a suitable coating (septum) absorbing the vibratory waves so as to minimize the contributions by these glazing units to the acoustic radiation in the passenger compartment and to qualify only the test glazing unit.

The insulation measurements were made at an ambient temperature of 18° C.

The curves shown in FIG. 10 demonstrate that the significant "hole" usually found in the transmission loss is reduced at and above the critical frequency, here in particular around 4000 Hz, so that the acoustic insulation remains relatively effective at this frequency.

Although in accordance with the first objective of the invention it is possible to dissipate the maximum amount of vibratory energy in the critical frequency region of the glazing unit (over a range from 30% below the critical frequency to 30% above the critical frequency), the invention also makes it possible to provide good vibro-acoustic damping over a wider frequency range, including at low frequencies. Thus, FIG. 11 shows that the insulation curves relating to the glazing units of the invention lie above the curve corresponding to the bare glazing unit.

The invention claimed is:

1. A glazing unit comprising:
   at least one glass sheet; and
   at least one vibro-acoustic damping strip, which is fastened onto at least one of faces of the glass sheet and that includes at least one element made of damping material having a loss factor of at least 0.4,
   wherein the strip is joined to no other device on a face of the strip that is on an opposite side from a face of the glass sheet and the strip also includes at least one weighting element that has a linear mass of greater than 0.05 kg/m and is fastened onto the element made of damping material, the linear mass corresponding to a ratio of a mass of the weighting element to a longer length of the weighting element of a face of the weighting element in contact with the element made of damping material, the element made of damping material being inserted between the glass sheet and the weighting element and having a Young's modulus of less than 200 MPa at 20° C. for frequencies below 5000 Hz, the weighting element being joined only to a face of the element made of damping material that is on an opposite side from a face of the element made of damping material in contact with the glass sheet.

2. The glazing unit as claimed in claim 1, wherein the element made of damping material has a cross section, only one side of the cross section being in contact with the glazing unit and corresponding to one of shortest extents of the damping element, which has suitable dimensions so that, according to the Young's modulus of the damping material, the damping element dissipates the maximum amount of energy for a particular frequency.

3. An acoustic protection method in a vehicle passenger compartment, comprising using a glazing unit as claimed in claim 2.

4. The glazing unit as claimed in claim 2, wherein the cross section of the element made of damping material, defined by a width L in contact with the glazing unit and by a thickness e normal to the glazing unit, has dimensions such that equivalent linear stiffness $K'_{eq}$ of the damping element satisfies, at a targeted particular frequency $f_p$, the criterion:

$$\frac{K'_{eq}}{\rho_v e_v \lambda_p \omega_p^2} < \frac{1}{2}$$

where:

$$K'_{eq} = \frac{E'L}{e}$$

in which:
   E' is the Young's modulus of the damping material at 20° C. and at the frequency $f_p$;
   L is the width of the damping element in contact with the glazing unit;
   e is the dimension of the damping element normal to the glazing, and in which:
   $\rho_v$ is the density of the material of which the glazing unit is made;
   $e_v$ is the thickness of the glazing unit;
   $\omega_p$ is the target angular frequency at the particular frequency $f_p$ defined by $\omega_p = 2\pi f_p$; and
   $\lambda_p$ is the wavelength in the glazing unit corresponding to the particular frequency $f_p$ and defined in a known manner by:

$$\lambda_p = 2\pi \sqrt[4]{\frac{E'_v e_v^2}{12(1 - v_v^2)\rho_v \omega_p^2}}$$

and in which $E'_v$ and $v_v$ are the Young's modulus and the Poisson's ratio of the material of which the glazing unit is made, respectively.

5. The glazing unit as claimed in claim 2, wherein the particular frequency corresponds to the critical frequency $f_c$ of the glazing unit or to a frequency within the [$f_c-0.3f_c$; $f_c+0.3f_c$] range.

6. The glazing unit as claimed in claim 1, wherein the weighting element contacts only a single face of the element made of damping material and along the greatest extent of the damping element.

7. The glazing unit as claimed in claim 1, wherein the strip is placed close to the edge or at the edge of the glazing unit and extends over at most the length of one side of the glazing unit.

8. The glazing unit as claimed in claim 1, wherein the strip includes a single element made of damping material and a single weighting element.

9. The glazing unit as claimed in claim 1, wherein the strip includes a plurality of elements made of damping material, which may or may not be juxtaposed and that extend side by side along their largest extents, and a single weighting element that covers one of the faces of each element made of damping material.

10. The glazing unit as claimed in claim 1, wherein the strip includes a plurality of weighting elements that are fastened onto a single element made of damping material and that extend along the largest extent of the damping element, which weighting elements may or may not abut one another.

11. The glazing unit as claimed in claim 1, wherein the weighting element is a web fastened onto one of the faces of the element made of damping material and includes a reinforcement joined to the web.

12. The glazing unit as claimed in claim 1, wherein the element made of damping material includes one or more damping materials, each having a loss factor of at least 0.4.

13. The glazing unit as claimed in claim 1, wherein the weighting element includes one or more materials giving it a linear mass of at least 0.05 kg/m.

14. The glazing unit as claimed in claim 1, further comprising a plurality of strips.

15. The glazing unit as claimed in claim 1, wherein the strip includes at least an elastomer as the damping element and a metal plate as the weighting element.

16. The glazing unit as claimed in claim 1, wherein the glazing is configured to be housed in a body of a vehicle, or an automobile, the strip being hidden from view and independent of the body.

17. A method of manufacturing a glazing unit for reducing acoustic and vibratory nuisance in a passenger compartment of a vehicle, or an automobile including such a glazing unit, the method comprising:

joining at least one vibro-acoustic damping strip to the glazing unit, the strip including at least one element made of damping material having a loss factor of at least 0.4 and a Young's modulus at 20° C. of less than 200 MPa, for frequencies below 5000 Hz, and at least one weighting element having a linear mass of at least 0.05 kg/m fastened onto only a face of the damping element on an opposite side from the glazing unit;

adapting a cross section of the element made of damping material, the section being defined by a width L being a shorter side of the element made of damping material in contact with the glazing unit and by a thickness e normal to the glazing unit, according to the Young's modulus of the damping material, such that the equivalent linear stiffness $K'_{eq}$ of the damping element satisfies, at a targeted particular frequency $f_p$, the criterion:

$$\frac{K'_{eq}}{\rho_v e_v \lambda_p \omega_p^2} < \frac{1}{2}$$

where:

$$K'_{eq} = \frac{E'L}{e}$$

in which:
E' is the Young's modulus of the damping material at 20° C. and at the frequency $f_p$;
L is the width of the damping element in contact with the glazing unit;
e is the dimension of the damping element normal to the glazing, and in which:
$\rho_v$ is the density of the material of which the glazing unit is made;
$e_v$ is the thickness of the glazing unit;
$\omega_p$ is the target angular frequency at the particular frequency $f_p$ defined by $\omega=2\pi f_p$; and
$\lambda_p$ is the wavelength in the glazing unit corresponding to the particular frequency $f_p$ and defined in a known manner by:

$$\lambda_p = 2\pi \sqrt[4]{\frac{E'_v e_v^2}{12(1-v_v^2)\rho_v \omega_p^2}}$$

and in which $E'_v$ and $v_v$ are the Young's modulus and the Poisson's ratio of the material of which the glazing unit is made, respectively; and fastening the strip onto the glazing unit via a face of the element made of damping material on an opposite side of a face fixed to the weighting element, no other device being joined to the strip.

18. The method of manufacturing a glazing unit as claimed in claim 17, wherein the particular frequency $f_p$ corresponds to the critical frequency of the glazing unit.

19. A method of manufacturing a glazing unit, comprising using a glazing unit as claimed in claim 1.

20. An acoustic protection method in a passenger compartment of a vehicle, or an automobile including a glazing unit that includes at least one vibro-acoustic damping strip, the method comprising:

using a strip including at least one element made of damping material having a loss factor of at least 0.4 and a Young's modulus of less than 200 MPa at 20° C. for frequencies below 5000 Hz, and at least one weighting element fastened onto a single face of the damping element along its greatest extent, the strip being fastened via the element made of damping material onto one of the faces of the glazing unit on the opposite side from the weighting element, no device other than the glazing unit being joined to the strip.

* * * * *

UNITED STATES PATENT AND TRADEMARK OFFICE
CERTIFICATE OF CORRECTION

| | | |
|---|---|---|
| PATENT NO. | : 7,931,117 B2 | Page 1 of 1 |
| APPLICATION NO. | : 12/594305 | |
| DATED | : April 26, 2011 | |
| INVENTOR(S) | : Sylvain Payot et al. | |

It is certified that error appears in the above-identified patent and that said Letters Patent is hereby corrected as shown below:

Column 4, line 13, change "$\omega_p = 2\pi/f_p$" to --$\omega_p = 2\pi f_p$--.

Signed and Sealed this
Ninth Day of August, 2011

David J. Kappos
*Director of the United States Patent and Trademark Office*